United States Patent
Lythgoe

(10) Patent No.: US 10,500,777 B2
(45) Date of Patent: Dec. 10, 2019

(54) METHOD AND APPARATUS FOR FORMING AN EXPANDABLE FOAM PELLET HAVING A HARD OUTER SHELL BY UNDERWATER PELLETIZING, AND EXPANDABLE FOAM PELLETS FORMED THEREBY

(71) Applicant: GALA INDUSTRIES, INC., Eagle Rock, VA (US)

(72) Inventor: Mark Anthony Lythgoe, Eagle Rock, VA (US)

(73) Assignee: Gala Industries, Inc., Eagle Rock, VA (US)

( * ) Notice: Subject to any disclaimer, the term of this patent is extended or adjusted under 35 U.S.C. 154(b) by 0 days.

(21) Appl. No.: 15/639,857

(22) Filed: Jun. 30, 2017

(65) Prior Publication Data

US 2018/0001532 A1    Jan. 4, 2018

Related U.S. Application Data

(60) Provisional application No. 62/357,738, filed on Jul. 1, 2016.

(51) Int. Cl.
| | | |
|---|---|---|
| *B29C 47/00* | (2006.01) |
| *B29C 48/00* | (2019.01) |
| *B29C 48/04* | (2019.01) |
| *B29C 48/88* | (2019.01) |
| *B29B 9/12* | (2006.01) |
| *B29C 44/34* | (2006.01) |
| *B29B 9/06* | (2006.01) |
| *B29K 25/00* | (2006.01) |
| *B29K 105/00* | (2006.01) |
| *B29K 105/04* | (2006.01) |
| *B29K 101/12* | (2006.01) |

(52) U.S. Cl.
CPC .......... *B29C 48/0022* (2019.02); *B29B 9/065* (2013.01); *B29B 9/12* (2013.01); *B29C 44/3461* (2013.01); *B29C 48/0012* (2019.02); *B29C 48/04* (2019.02); *B29C 48/911* (2019.02); *B29K 2025/06* (2013.01); *B29K 2101/12* (2013.01); *B29K 2105/0005* (2013.01); *B29K 2105/043* (2013.01); *B29K 2105/048* (2013.01)

(58) Field of Classification Search
CPC ......... B29B 9/06; B29B 9/12; B29C 44/3461; B29C 47/0011; B29C 47/0042; B29C 47/0066; B29C 47/8815; B29K 2025/06; B29K 2101/12; B29K 2105/0005; B29K 2105/043; B29K 2105/048
See application file for complete search history.

(56) References Cited

U.S. PATENT DOCUMENTS

| | | | |
|---|---|---|---|
| 3,615,972 A | 10/1971 | Morehouse, Jr. |
| 5,591,808 A | 1/1997 | Jamison |
| 6,315,931 B1 | 11/2001 | Bruning et al. |
| 7,776,244 B2 | 8/2010 | Dietzen et al. |
| 7,815,828 B2 | 10/2010 | Kobayashi et al. |
| 9,126,178 B2 | 9/2015 | Kita et al. |
| 2005/0110182 A1* | 5/2005 | Eloo ...................... B29B 9/065 264/69 |
| 2006/0273482 A1 | 12/2006 | Kobayashi et al. |
| 2007/0208093 A1 | 9/2007 | Nordin et al. |
| 2009/0051061 A1 | 2/2009 | Seibring et al. |
| 2009/0269428 A1* | 10/2009 | Holmes ................... B29B 9/065 425/6 |
| 2010/0120929 A1 | 5/2010 | Naito et al. |
| 2011/0291318 A1 | 12/2011 | Martin et al. |
| 2013/0008823 A1* | 1/2013 | Hu ........................ B65D 65/466 206/524.1 |
| 2016/0039124 A1 | 2/2016 | Martin et al. |

FOREIGN PATENT DOCUMENTS

| | | |
|---|---|---|
| EP | 0126459 A2 | 11/1984 |
| EP | 0305862 A1 | 3/1989 |
| EP | 2 008 784 A1 | 12/2008 |

OTHER PUBLICATIONS

Search Report for International Application No. PCT/US17/40430.
Written Opinion for International Application No. PCT/US17/40430.

* cited by examiner

*Primary Examiner* — Irina S Zemel
(74) *Attorney, Agent, or Firm* — Troutman Sanders LLP

(57) ABSTRACT

A pre-expanded hard shell thermoplastic foam pellet is made by controlling the temperature of the melt exiting a die plate in an underfluid pelletizer, and by controlling the temperature and pressures of the cooling fluid as the pellet flows from the cutting chamber through the slurry line toward a centrifugal dryer. The process and apparatus used for controlling the above parameters is described in conjunction with making the pellets. The pellets thus formed may have a generally spherical shape, or they may have odd, irregular shapes with foam hemorrhages protruding therefrom, depending on the conditions during pre-expansion.

14 Claims, 7 Drawing Sheets

METHOD AND APPARATUS FOR FORMING AN EXPANDABLE FOAM PELLET HAVING A HARD OUTER SHELL BY UNDERWATER PELLETIZING, AND EXPANDABLE FOAM PELLETS FORMED THEREBY

CROSS-REFERENCE TO RELATED APPLICATIONS

The present application claims the benefit of U.S. Provisional Patent Application 62/357,738, filed Jul. 1, 2016 and titled "Method and Apparatus for Forming an Expandable Foam Pellet Having a Hard Outer Shell by Underwater Pelletizing, and Expandable Foam Pellets Formed Thereby."

FIELD OF THE INVENTION

The present invention is directed to a process for forming a thermoplastic, expandable foam pellet having a hard outer shell surrounding the interior expandable foam using an underfluid pelletizer. The present invention is also directed to the expandable foam pellets having a hard outer shell formed by the process and apparatus.

DESCRIPTION OF THE RELATED ART

There have been several attempts at making thermoplastic expandable pellets having an outer shell.

U.S. Pat. No. 9,126,178 to Chou, et al. discloses a process for forming a heat expandable microsphere by forming a particle during polymerization, and treating the outer surface of the formed particle with a metal containing, organic compound.

U.S. Pat. No. 3,615,972 to Morehouse, Jr., et al. shows a process for creating an expandable microsphere having an outer wall by an aqueous suspension-type polymerization of droplets of a monomer and blowing agent.

U.S. published application 2007/0208093 to Nordin, et al. relates to thermally expandable thermoplastic microspheres comprising a polymer shell made from ethylenically unsaturated monomers encapsulating a propellant, produced during a polymerization process.

U.S. published application 2010/0120929 to Naito, et al. discloses a method to produce heat-expandable microspheres having a shell of thermoplastic resin and a blowing agent being encapsulated therein. These microspheres, and those in the previous references, are accomplished via a polymerization process and not by underfluid pelletizing.

U.S. Pat. No. 7,776,244 to Dietzen, et al., U.S. Pat. No. 7,815,828 to Kobayashi, et al., European published patent application EP0126459 to Biglione, et al. and European published patent application EP0305862 to Allen, et al. all show forming thermoplastic resin expandable granules by underwater pelletizing. None of Dietzen, Kobayashi, Biglione, or Allen mentions forming a hard shell surrounding the expandable granule.

U.S. Pat. No. 6,315,931 to Bruning, et al. shows a method of producing a foamed granulate, wherein a thermoplastic synthetic material is placed in an extruder, the synthetic material is melted, a pressurized expanding agent is fed through one or several injection nozzles, the molten material enriched with the expanding medium is foamed as it exits through a perforated plate arranged at the outlet of the extruder and is granulated by a cutting device arranged behind the perforated plate. While Bruning controls the temperature and pressure of the cooling medium at the cutting chamber to directly harden the surface of the granulate into a closed film having a smooth surface, this film is not disclosed as being in the form of a hard shell, and his process is specific to pelletization of polypropylene.

SUMMARY OF THE INVENTION

It is an object of the present invention to manufacture a partially expanded, thermoplastic, expandable foam pellet having a hard outer shell through control of process parameters in underfluid pelletizing.

It is another object of the present invention to control the process parameters in underfluid pelletizing to control the thickness of the shell on the formed pellet.

It is another object of the present invention to control the process parameters in underfluid pelletizing to control the degree of pre-expansion of the hard shell foam pellet.

It is another object of the present invention to control the process parameters in underfluid pelletizing to control the shape of the pre-expanded pellet from generally spherical to irregular, odd shaped hemorrhaged pellets.

It is another object of the present invention to control the process parameters in underfluid pelletizing in order to produce pre-expanded foam pellets of varying sizes. By varying the die hole diameter, extrusion hole land lengths, or a combination of the two, as well as cooling fluid temperature and pressure, melt temperature, and melt flow rate through the die hole, the pellet sizes may be varied at the cutting chamber. Further, pellet size may be varied by using a variable, programmed rotation speed of the cutter blades.

It is another object of the present invention to control the process parameters in underfluid pelletizing to control the degree of pre-expansion of the hard shell foam pellet while the pellet passes through the slurry line on the way to a centrifugal dryer.

In order to realize the above objects, the invention comprises apparatus for underfluid pelletizing (e.g. underwater pelletizing) of a blowing agent impregnated thermoplastic melt, and cutting of the melt into pellets at the face of a die in an underfluid cutting chamber. The die can have orifices such that regular size pellets, mini-pellets, or micro-pellets can be produced, depending on the diameter of the die holes, and the particular application of the resulting pellets. The invention also comprises apparatus and methods of using the apparatus for controlling the melt temperature and pressure as it passes through the die, as well as for controlling the temperature and pressures of the cooling fluid (e.g. cooling water) in the cutting chamber, as well as throughout the slurry line between the die face and the exit of the slurry line into a centrifugal or other type pellet dryer. These apparatus and methods result in producing a partially expanded, expandable foam pellet having a hard outer shell. The expandable foam pellet having a hard outer shell thus produced may be pre-expanded while being transported through the slurry line. Further, the expandable foam pellet having a hard outer shell thus produced may have a generally spherical shape, or may have an odd or irregular shape with foam hemorrhages produced on the pellet, as determined by the control of process parameters during and after pelletization. The pre-expanded hard shell foam pellet may be further expanded by heat or steam treatment after defluidizing and before final utilization of the pellets, depending on the desired density or pellet size for the particular application.

BRIEF DESCRIPTION OF THE DRAWINGS

Various embodiments of the invention are disclosed in the following detailed description and accompanying drawings, where.

DETAILED DESCRIPTION

The following is a detailed description of exemplary embodiments to illustrate the principles of the invention. The embodiments are provided to illustrate aspects of the invention, but the invention is not limited to any embodiment. The scope of the invention encompasses numerous alternatives, modifications and equivalents; it is limited only by the claims.

Numerous specific details are set forth in the following description in order to provide a thorough understanding of the invention. However, the invention may be practiced according to the claims without some or all of these specific details. For the purpose of clarity, technical material that is known in the technical fields related to the invention has not been described in detail so that the invention is not unnecessarily obscured.

Referring now to FIGS. 1 through 4, a representative apparatus used in carrying out the invention will be described. It should be noted that other means of providing a melt to the underfluid pelletizer may be employed, but not limited to, a twin screw extruder, melt tank and melt pump, reaction extrusion process or others as is known in the art.

Figure 1:
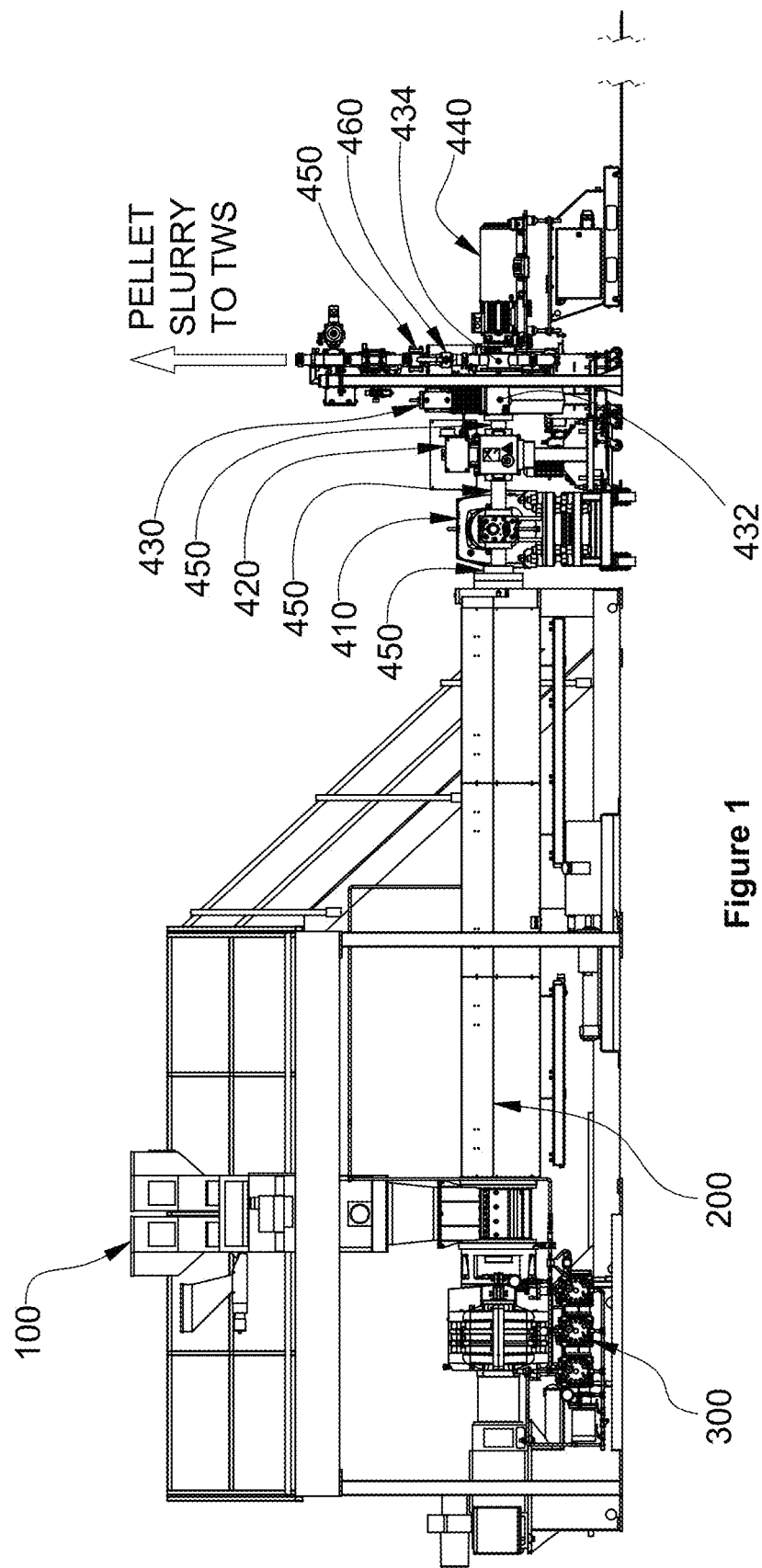
FIG. 1 is a side view of a type of feeder/extruder/pelletizer system used in the present invention.
Figure 2:
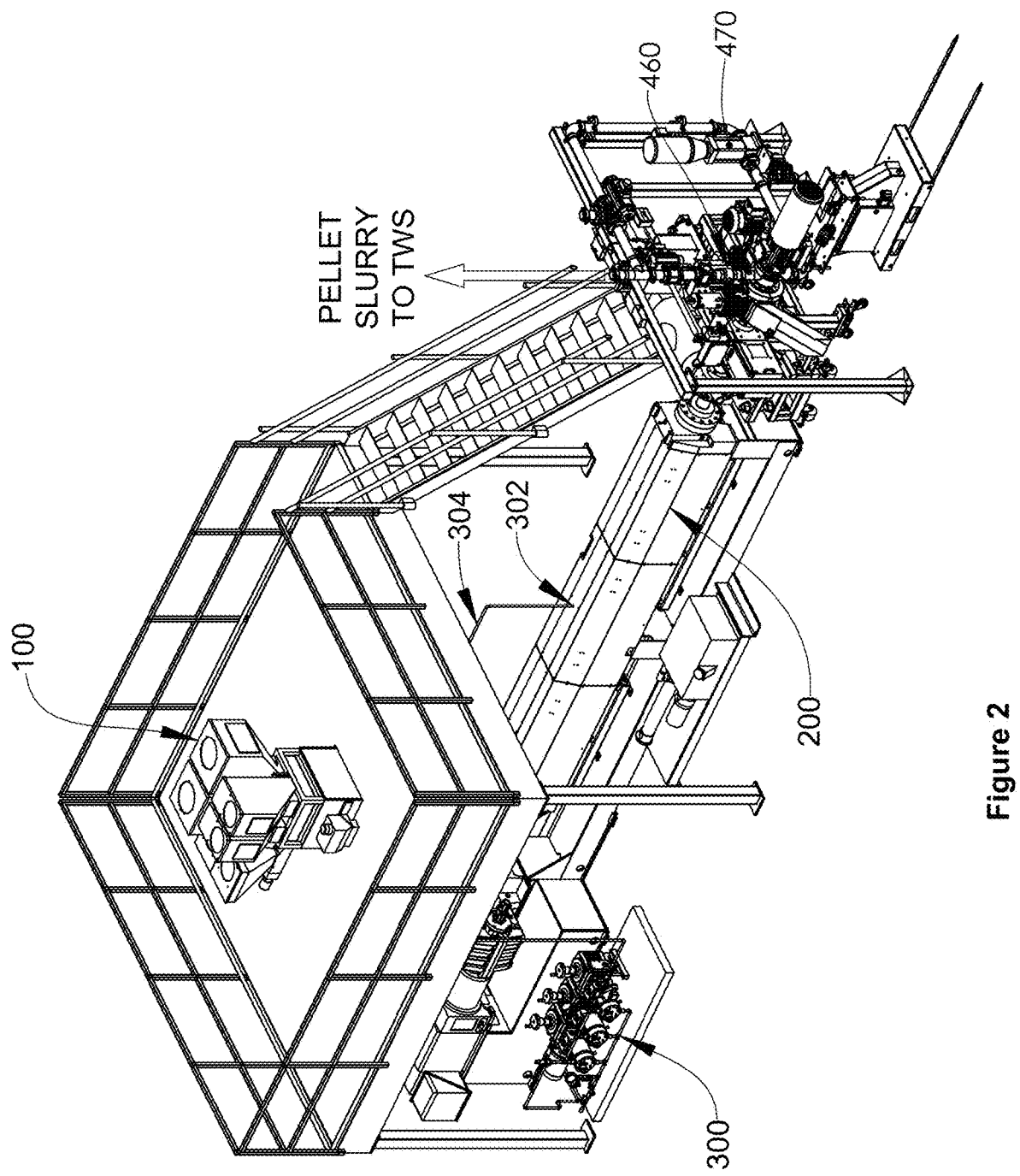
FIG. 2 is a perspective view of the system shown in FIG. 1.

In FIGS. 1 and 2, a system for extruding and pelletizing a thermoplastic melt containing a blowing agent is shown. A material blending system 100 receives a polymer material from which the pellets are formed, for example polystyrene. Other materials that are to be blended with the polymer material are also held in blending system 100 and then dispensed proportionally as required by the specific formulation. Examples of types of other materials are flame retardants, UV protectants, colorants, nucleating agents, etc.

Blended materials are dispensed from the material blending section 100 into the feeding throat of extruder 200. Extruder 200 may be a single screw extruder, twin screw extruder, either co-rotating or counter-rotating, or other type of extruder as is known in the art. The purpose of extruder 200 is to thoroughly mix the blended material received from the blending section, and to cause the meltable materials to melt as they exit the extruder.

In order to create an expandable foam pellet, a physical or chemical blowing agent may be added to the melt, preferably before the pellets are formed, and in the present case, a liquid physical blowing agent may be added during the mixing and melting of the blended material within the extruder. To accomplish this, a liquid blowing agent metering system 300 may be provided which meters a liquid blowing agent into the melt within the extruder so that it can be thoroughly mixed with the melt before the melt leaves the extruder. Blowing agent metering system 300 provides a proportional amount of blowing agent to the blended material through extruder inlet port 302 via blowing agent line 304. Examples of physical blowing agents that may be used are propane, butane, pentane, neopentane, isopentane, hexane, $CO_2$, etc. The preferred blowing agent in the present invention is a combination of one or more of the pentane isomers. Blowing agent may be added and mixed with the melted thermoplastic material at a typical rate of between about 3 and about 7 weight percent, or depending on the application, may be as low as about 1 percent or greater than about 7 percent weight.

Once the blended plastic polymer and blowing agent are mixed, it leaves the extruder 200 and may pass through a melt pump 410 where the melt is further pressurized, a screen changer 420 where the melt is filtered of particulate impurities, and a polymer diverter valve (PoDV) 430 where it can either continue on to a die plate, not shown, or be diverted to waste if the pelletizer 440 is not ready to receive the melt for pelletizing. If the melt is diverted to waste, it passes through an adjustable restrictor plug 432 at the exit of PoDV 430. Extruder 200, melt pump 410, screen changer 420 and polymer diverter valve 430 are all interconnected by means of adaptor plates 450 which match the fittings on the exit of one component to the fittings on the inlets of the next component.

Restrictor plug 432 restricts the volume of flow from the PoDV 430 so as to maintain the pressure within the system created by melt pump 410. If the melt were allowed to flow from the PoDV 430 unrestricted, there would be a pressure drop upstream of the valve allowing the melt to prematurely expand within the upstream components, causing serious issues at the die plate and cutter when trying to start-up and make pellets. Restrictor plug 432 can be manually or automatically adjusted so as to maintain the upstream pressures at the desired levels, above the vapor pressure of the blowing agent.

Blended plastic polymer melt with blowing agent flows from diverter valve 430 through a heated die plate, not shown, and into cutting chamber 434 where the strands exiting the die holes of the die plate are cut by pelletizer 440 into pellets. The size of the pellets can be determined in part by the orifice diameter of the die holes in the die plate. Micro-pellets having an unexpanded diameter less than 1.0 mm, mini-pellets having an unexpanded diameter of between 1.0 mm and 2.0 mm, and regular pellets with an unexpanded diameter of greater than 2.0 mm can all be made with this system depending on the orifice diameter of the die plate chosen, the melt flow rate through the die holes, and the speed of, and number of blades on, the cutter hub. The die plate may be heated with electric resistance heating elements or by flowing heated fluids through passages within the die. By heating the die plate to the desired temperature, the viscosity of the melt from the extruder and upstream components through the die plate can be further controlled, and therefore the pressure of the melt can likewise be controlled. If the temperature is too low, the viscosity of the melt will increase, the pressure of the melt through the plate will increase, and the flow of the melt through the die plate may decrease resulting in smaller pellets for a fixed cutter speed. Likewise, if the temperature is too high, the viscosity of the melt will decrease, the pressure of the melt through the plate will decrease, and the flow of the melt through the die plate may increase resulting in larger pellets for a fixed cutter speed. If the temperature gets too high, the melt may have a viscosity too low for cutting quality pellets. If the temperature of the die gets too low, the flow may reduce to a point where there can be die hole freeze off, causing plugged die holes and loss of pellet rate. The viscosity of the melt may also be impacted by the percentage of blowing agent. With isomers of pentane as a blowing agent for example, for a fixed temperature, increasing the percentage of pentane in the mixture will decrease the viscosity of the mixture.

Fluid (e.g. water) within the fluid system, and in particular within the cutting chamber 434 and immediately downstream thereof, may be kept at an elevated pressure by high pressure fluid pump 470. High pressure pump 470 maintains the fluid pressure within cutting chamber 434 at a pressure above the vapor pressure of the blowing agent within the pellet as it flows from the cutting chamber through the portion of the slurry line 500 immediately downstream of the cutting chamber 434. By keeping the pressure above that of the blowing agent vapor pressure at the internal temperature of the pellet, the pellets are prevented from expanding prematurely. Typical pressures are greater than atmospheric up to 10 bar, or higher, depending on the temperature of the melt, temperature of the cooling fluid, and the make-up of the blowing agent being used. This pressure may be controlled by controlling the fluid flow rate of the high pressure pump. A sight glass 450 is provided in the slurry line immediately downstream of the cutting chamber 434 for visual inspection of the pellets formed during the cutting process.

In order to control the pressure in the cutting chamber, or more specifically, the pressure drop in the line downstream of the cutting chamber 434, a throttle valve 460 may be provided some distance downstream of the cutting chamber 434. Throttle valve 460 can be variably controlled to cause a restriction in the slurry line 500. High pressure pump 470 maintains pressure in the line from the cutting chamber up to the throttle valve 460, wherein flow passing through the restriction caused by throttle valve 460 immediately sees a drop in pressure as it passes through the valve. This drop in pressure causes the pressure in the cooling and transport fluid in the slurry line 500 to be lower than the vapor pressure of the blowing agent contained within the pellet, causing the pellet to expand. The amount of expansion can be controlled by controlling the amount of pressure drop across throttle valve 460 in conjunction with the temperature of the cooling and transport fluid, and the placement of the throttle valve 460 within the slurry line 500. The location of throttle valve 460 determines the dwell time of the pellet in the cooling fluid while under high fluid pressure, with a farther downstream location relative to the cutting chamber causing a longer dwell time, and a closer downstream location relative to the cutting chamber causing a shorter dwell time. The longer the dwell time is before expansion of the pellet, the thicker, and therefore harder, the hard shell is on the exterior of the pellet. Also the colder the cooling fluid is between the cutting chamber 434 and the throttle valve 460, the thicker and harder the shell will be. Therefore, it can be seen that by controlling the temperature of the cooling fluid, the location of the throttle valve, and the amount of pressure drop across the throttle valve, the thickness and hardness of the outer shell of the pellet can be controlled, as well as the amount of pre-expansion of the pellet. The throttle valve 460 may be manually controlled, as in a handle actuated ball valve, or may be automatically controlled via pressure sensor feedback and servo actuation. Other types of valve designs may also be used, such as pinch valves, gate valves, etc. The valve may be adjusted for a greater or lesser pressure drop across the valve to control the degree of pre-expansion of the expandable pellets.

Figure 3:
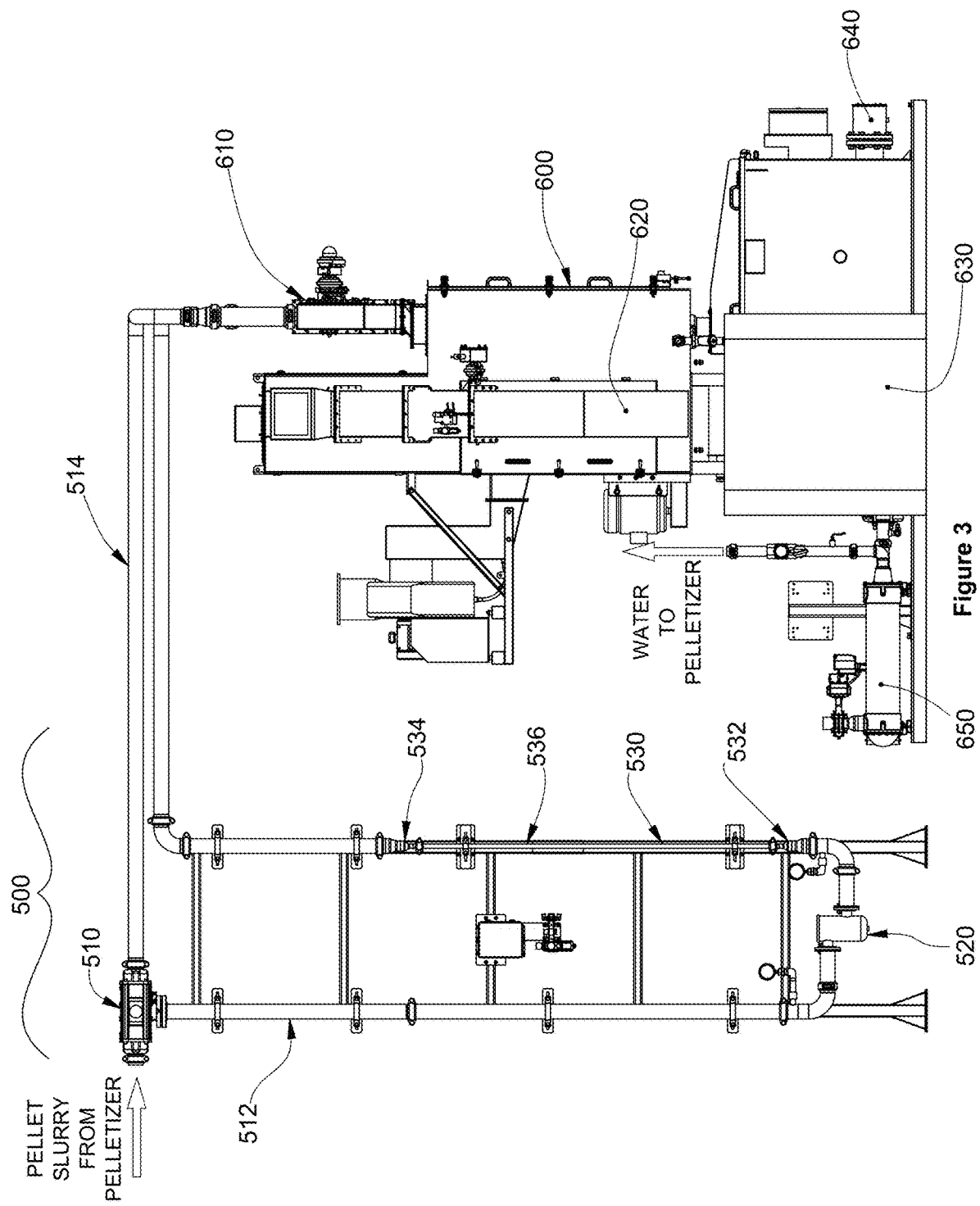
FIG. 3 is a side view of a type of slurry line having a bi-conical restrictor pipe section therein, and centrifugal dryer, as used in the present invention.
Figure 4:
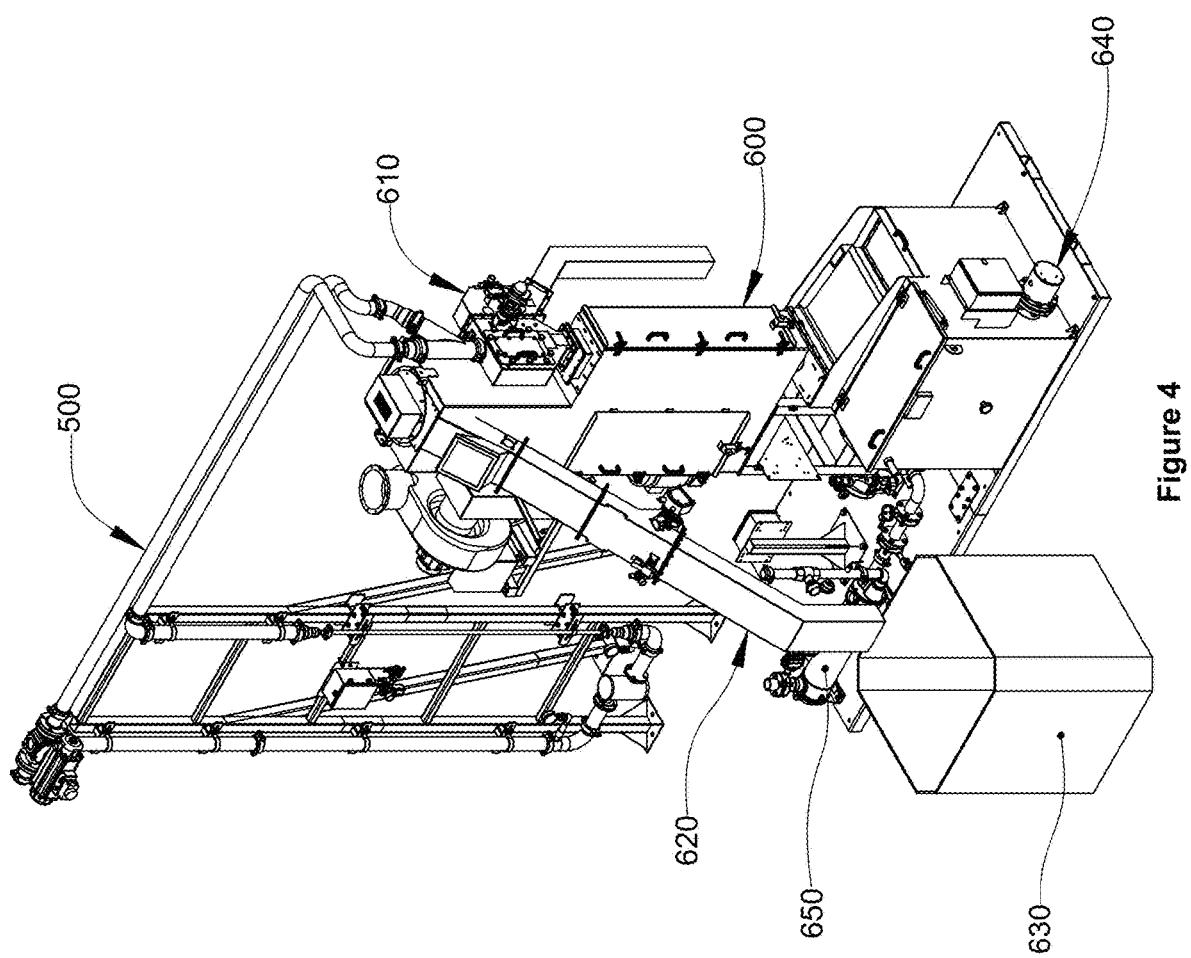
FIG. 4 is a perspective view of the system shown in FIG. 3.

Referring now to FIGS. 3 and 4, the portion of the system downstream of the adjustable throttle valve 460 is shown. Pellet slurry downstream of the throttle valve enters a high pressure by-pass valve 510, where the slurry can be directed in different directions. When producing the pre-expanded pellets of the present invention, slurry is directed into pipe slurry 514 which takes the slurry directly to a drying system 600, where fluid is removed from the pellets and the pellets exit the drying system 600 through pellet exit chute 620 to be collected in some form of container, illustrated as Gaylord pallet box 630. Other container types may be used, and the pallet box 630 is used as an illustration of one type. The temperature of the fluid is controlled by immersion heater 640, which heats the fluid, and by heat exchanger 650, which cools the fluid. The drying system 600 is illustrated as a centrifugal type pellet dryer having an agglomerate catcher 610 for removal of agglomerates and followed by initial defluidizing prior to the pellets entering the centrifugal dryer. It should be understood that other types of pellet drying systems may be used in place of the centrifugal dryer, and the centrifugal dryer is for illustrative purposes only and does not form a part of the invention.

In another embodiment, pre-expansion of the foam pellets and formation of the hard outer shell may also be controlled without the use of the above described throttle valve. This can be done by controlling the physical parameters within the system during pelletization. These parameters include cooling fluid temperature, cooling fluid flow rate, melt temperature, melt flow rate, pelletizer speed, and number of blades on the cutter hub.

It has been found that, at a constant melt flow rate, by keeping the cooling fluid (e.g. water) as hot as possible, for example 200° F., a pre-expanded, generally spherical foam pellet having maximum pre-expansion, a foam center of fine cell structure, and a hard outer shell is formed. As the cooling fluid temperature decreases, the expanded pellets begin to form a hollow center region within the foam core and hard shell, and the amount of pre-expansion is reduced. A further decrease in temperature, to 155° F. for example, results in the pellets beginning to form hemorrhages. This is caused as the melt swell exiting the die plate is frozen off by the cooling fluid as the cutter blade cuts the pellet from the die exit. The cut region at the backside of the pellet is still hot at the instant it is cut, and the expanding blowing agent within forces the hot inner material out through the region of the cut forming the hemorrhage. As the cooling fluid temperature further decreases, to 110° F. for example, the hardened swell portion reduces in size as the hemorrhage portion on the pellet increases in size.

At a constant fluid temperature, varying the melt flow rate through the die may affect the size of the pellet, the amount of hemorrhage of the pellet, and the amount of pre-expansion. At a colder fluid temperature of 110° F. for example, increasing the melt flow rate may result in a larger pellet having a much larger hemorrhage portion as compared to a pellet formed with a lower melt flow rate.

Figure 5:
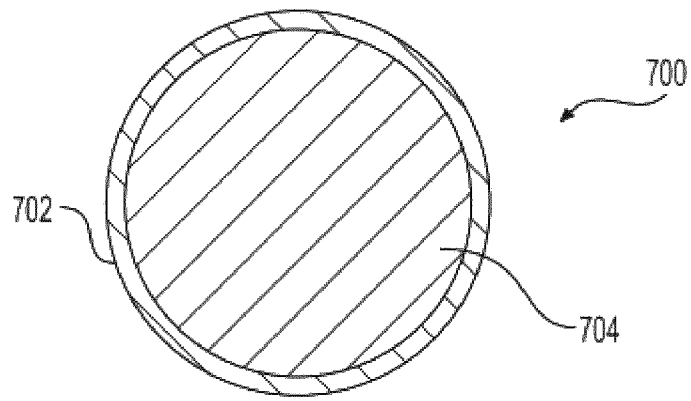
FIG. 5 is a cross-section of a hard shell foam pellet formed by the process of the present invention.
Figure 6:
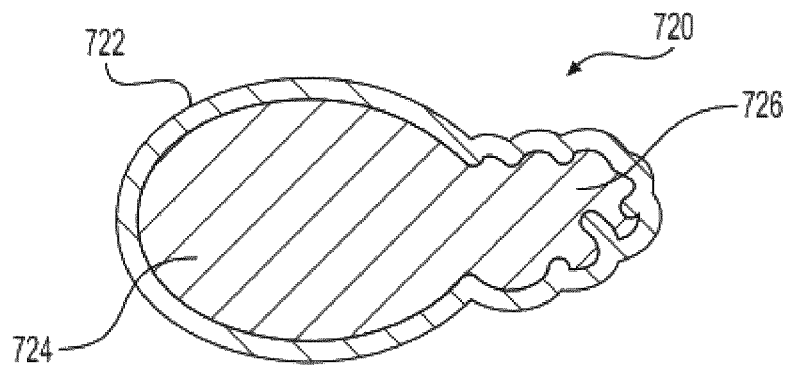
FIG. 6 is a cross section of an odd-shaped, hemorrhaged pellet formed by the process of the present invention.
Figure 7:
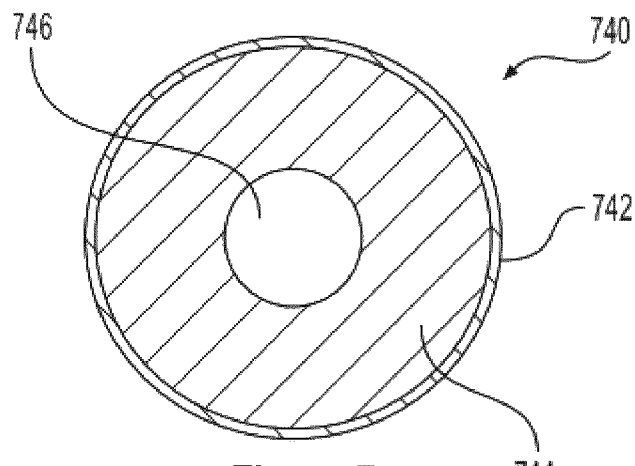
FIG. 7 is a cross section of a hard shell foam pellet having a hollow center region formed by the process of the present invention.
Figure 8:
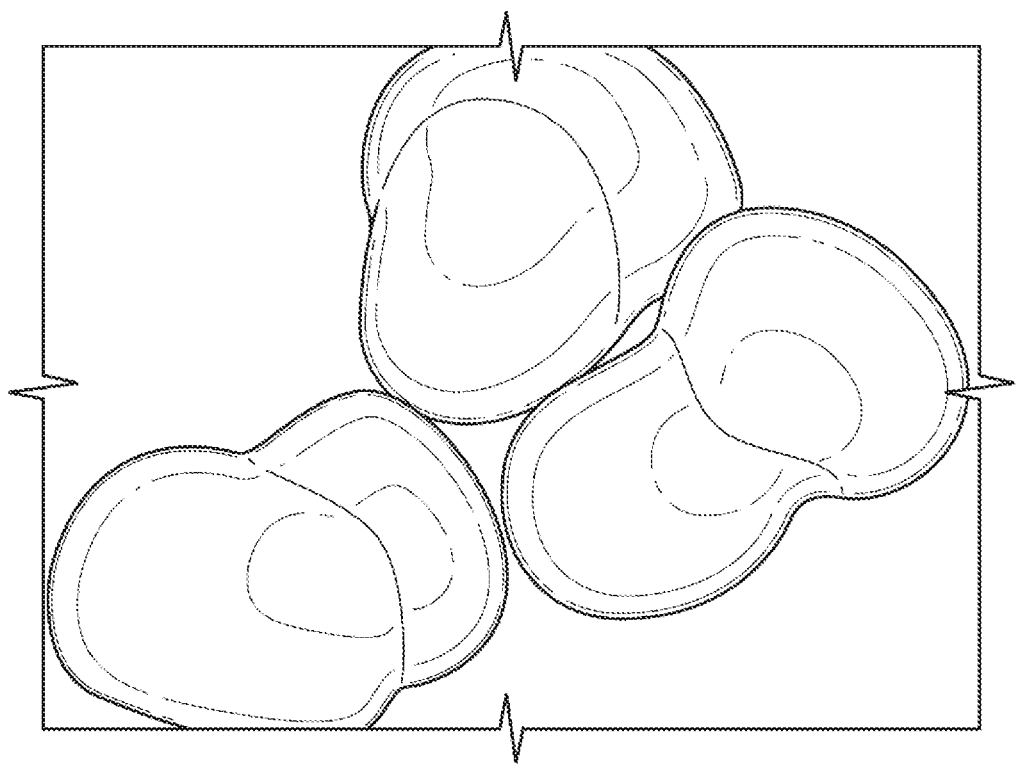
FIG. 8 is a photograph of an odd-shaped, hemorrhaged pellet formed by the process of the present invention.
Figure 9:
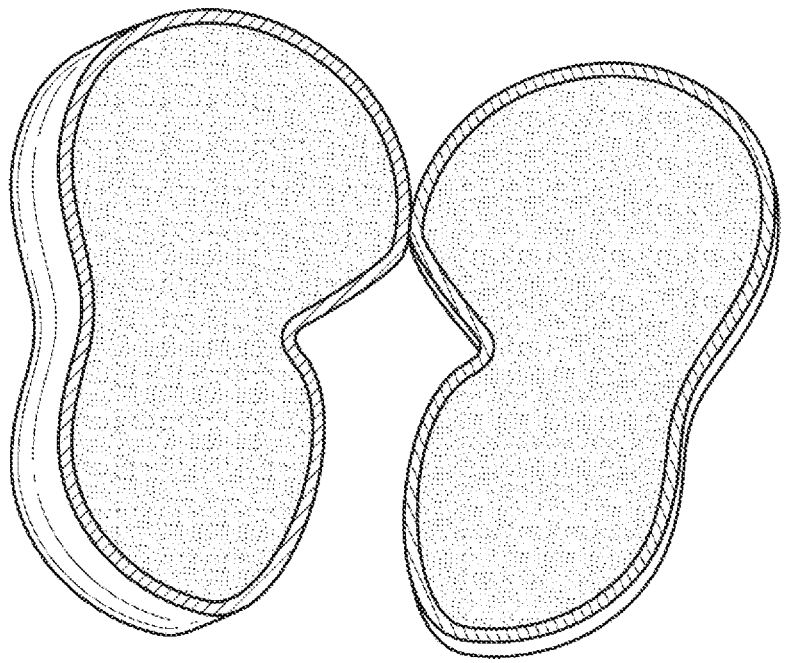
FIG. 9 is a photograph of an odd-shaped, hemorrhaged pellet formed by the process of the present invention and cut open to show the porous center.
Figure 10:
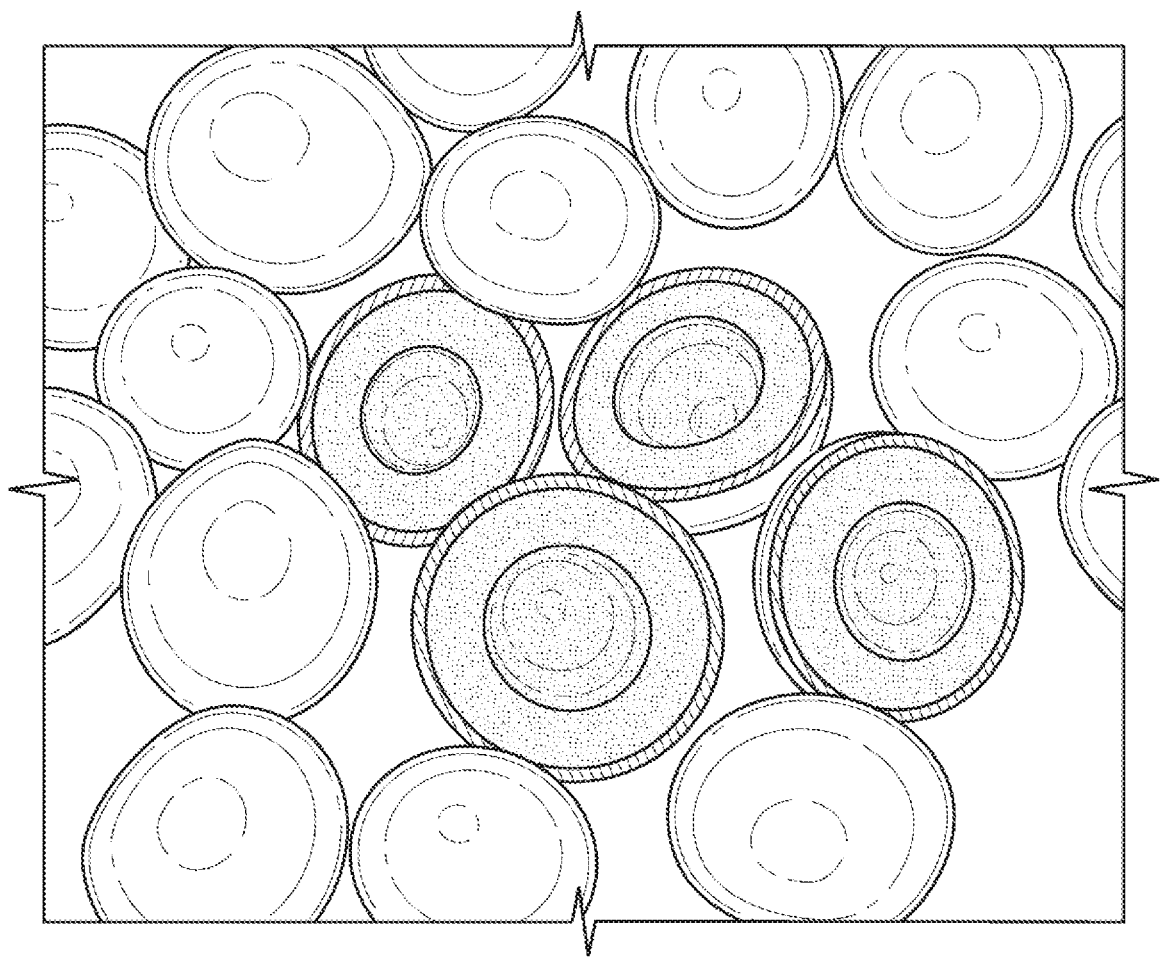
FIG. 10 is a photograph of hard shell foam pellets having a hollow center region formed by the process of the present invention, some pellets solid and some pellets cut open.

Now referring to FIGS. 5-10, pellet 700 in FIG. 5 is a pre-expanded pellet produced by the process of the present invention. Pellet 700 is a generally spherical pellet having a smooth, hard outer shell 702 encapsulating a partially expanded foam center 704. The thickness and hardness of the shell 702, as well as the degree of pre-expansion of the foam center 704, can be controlled by the parameters as previously discussed, namely the temperature and pressure of the melt at the die exit, the cooling fluid temperature, the pressure of the cooling fluid, the flow rate of the cooling fluid, and optionally, the location of a throttle valve downstream of the cutting chamber, as well as the amount of pressure drop across the throttle valve. In FIGS. 6 and 8, a pre-expanded pellet 720 is shown having an irregular shape. Pellet 720 also includes a smooth, hard shell 722 and pre-expanded foam center 724 (also shown in FIG. 9). In addition, pellet 720 has been formed to have a foam hemorrhaged portion 726. Hemorrhaged portion 726 is also caused by control of the above parameters. In the case where a throttle valve is used, throttle valve 460 is positioned in a location and adjusted to a pressure drop which causes a sudden expansion of the pellet resulting in the hemorrhage 726. Hemorrhaged portion 726 also has a hard outer shell surrounding a foamed inner region. Hemorrhaged pellets 720 may also be formed without the use of throttle valve 460 by lowering the cooling fluid temperature and increasing the melt flow rate to a point where the cut pellets begin to form the hemorrhages. The size of the pellet and its hemorrhage may be controlled by adjusting the cooling fluid temperature and/or the melt flow rate, accordingly. Pellets having such an irregular shape have an increased surface area and may be desired for certain applications, including use as a filler material where it is desired that the base material bonds effectively to the filler material. The hard shell of the pellet may prevent collapse or compression of the foam center of the pellet in certain applications, while still providing a pellet with relatively low density. In FIGS. 7 and 10, a hard shell foam pellet 740 is shown having a hardened outer shell 742 and an expanded foam center 744. Within the center region of the foam core is a hollow region 746. Hollow region 746 is formed by controlling the temperatures intermediate of pellet 700 with a solid foam center formed at hotter fluid temperatures, and the hemorrhaged pellet 720 formed at cooler fluid temperatures. The size of the hollow region can also be controlled by controlling the fluid temperatures within the intermediate temperature range for forming hollow pellets 740.

It should be understood that the pre-expanded hard shell foam pellet produced in the underfluid pelletization process may be further expanded by heat or steam treatment after drying and before final utilization of the pellets, depending on the desired density or pellet size for the particular application.

To describe how the changes to process parameters effect the pellet configuration, the below table is offered to show the change in the fluid temperature parameter, where the fluid is water.

| | Pelletizer Speed | Melt Temp | Water Temp | Water Flow | Pellet Description |
|---|---|---|---|---|---|
| Ex. 1 | 1400 rpm | 480° F. | 180° F. | 80 GPM | Spherical, foamed center with hard shell |
| Ex. 2 | 1400 rpm | 480° F. | 160° F. | 80 GPM | Spherical, hollow foamed center with hard shell |
| Ex. 3 | 1400 rpm | 480 °F. | 145° F. | 80 GPM | Medium size hemorrhage, hard outer shell |
| Ex. 4 | 1400 rpm | 480° F. | 110° F. | 80 GPM | Large hemorrhage portion with hard outer shell |

If pre-expanded pellets are not being made and instead unexpanded expandable foam pellets are being made in the underfluid pelletizer, then bypass valve 510 can direct the slurry through slurry pipe section 512. Slurry passing through pipe section 512 remains under the high pressure created by high pressure pump 470, preventing pre-expansion of the pellets. The slurry passes through optional filter 520 before entering bi-conical restrictor pipe section 530. Bi-conical restrictor pipe section 530 comprises a conical pipe diameter reducing section 532, an extended length of reduced diameter pipe section 536, followed by a conical diameter expansion section 534. Bi-conical restrictor pipe section 530 aids in maintaining the high pressure created by high pressure pump 470 up until the slurry passes through expansion portion 534, where after the slurry experiences a pressure drop. The location of bi-conical pipe section 530 is such that the slurry experiences a dwell time in the piping circuit sufficient to allow the pellet to cool under high pressure to a temperature where the vapor pressure of the blowing agent contained therein is equal to or lower than the pressure of the slurry exiting diameter expansion section 534. In this manner, the pellets are prevented from pre-expanding prematurely.

The disclosed embodiments are meant to be illustrative and not restrictive. While specific configurations of the process and apparatus for producing expandable pellets having a hard shell by underfluid pelletizing have been described, it is understood that the present invention can be applied to a wide variety of pelletizers and materials. There are many alternative ways of implementing the invention.

What is claimed is:

1. An extrusion process for producing pre-expanded foam pellets having a hard outer shell, the process comprising:
   metering a blowing agent into a polymer melt;
   forcing the polymer melt through an extrusion die and into a cutting chamber comprising a fluid inlet and a pellet slurry outlet and enclosing a cutter hub assembly comprising a plurality of cutter blades;
   cutting the extruded melt by rotating the plurality of cutter blades at a programmed rotation speed to produce one or more pellets;
   directing a flow of fluid in the fluid inlet, through the cutting chamber, and out the pellet slurry outlet to pull the one or more pellets away from the cutting chamber in a pellet slurry; and
   cooling the one or more pellets in the pellet slurry at a temperature and pressure effective to produce one or more foam pellets having a hard outer shell and a pre-expanded foam center.

2. The process of claim 1, wherein the blowing agent comprises a propane, butane, pentane, neopentane, isopentane, hexane, $CO_2$, or combinations thereof.

3. The process of claim 1, wherein the blowing agent is added and mixed at a rate of between about 1 and about 7 percent weight.

4. The process of claim 1, wherein cutting the extruded melt further comprises varying the programmed rotation speed of the cutter blades.

5. An extrusion process for producing pre-expanded foam pellets having a hard outer shell, the process comprising:
   feeding a polymer material into a material blending system to form a blended material;
   feeding the blended material into a throat of an extruder to form a polymer melt;
   metering a blowing agent into the melt;
   extruding the melt through an extrusion die and into a cutting chamber comprising a fluid inlet and a pellet slurry outlet and enclosing a cutter hub assembly comprising a plurality of cutter blades;

cutting the extruded melt by rotating the plurality of cutter blades at a programmed rotation speed to produce one or more pellets;

directing a flow of fluid in the fluid inlet, through the cutting chamber, and out the pellet slurry outlet to pull the one or more pellets away from the cutting chamber in a pellet slurry; and cooling the one or more pellets in the pellet slurry effective to produce one or more foam pellets having a hard outer shell and a pre-expanded foam center.

6. The process of claim 5, further comprising drying the one or more foam pellets.

7. The process of claim 6, further comprising further expanding the defluidized foam pellets via one or more of a heat and a steam treatment.

8. A pellet formed by the process of claim 1.

9. A pellet formed by the process of claim 5.

10. The pellet of claim 8, comprising a hard outer shell, and a pre-expanded foam center, wherein the hard outer shell encapsulates the pre-expanded foam center.

11. The pellet of claim 10, wherein the pre-expanded foam center is partially expanded such that it can be further expanded.

12. The pellet of claim 10, wherein the hard outer shell is generally spherical.

13. The pellet of claim 10, further comprising a hemorrhaged portion.

14. The pellet of claim 10, wherein the pre-expanded foam center has a hollow center region.

* * * * *